United States Patent
Vallone

(10) Patent No.: US 10,157,116 B2
(45) Date of Patent: Dec. 18, 2018

(54) WINDOW DEVIATION ANALYZER

(71) Applicant: Google Inc., Mountain View, CA (US)

(72) Inventor: Anthony Vallone, Seattle, WA (US)

(73) Assignee: Google LLC, Mountain View, CA (US)

( * ) Notice: Subject to any disclaimer, the term of this patent is extended or adjusted under 35 U.S.C. 154(b) by 128 days.

(21) Appl. No.: 15/361,565

(22) Filed: Nov. 28, 2016

(65) Prior Publication Data

US 2018/0150373 A1    May 31, 2018

(51) Int. Cl.
| G06F 9/00 | (2006.01) |
|---|---|
| G06F 9/24 | (2006.01) |
| G06F 11/34 | (2006.01) |
| G06F 9/445 | (2018.01) |
| G06F 11/30 | (2006.01) |
| G06F 11/36 | (2006.01) |

(52) U.S. Cl.
CPC ...... *G06F 11/3409* (2013.01); *G06F 9/44505* (2013.01); *G06F 11/3024* (2013.01); *G06F 11/3612* (2013.01)

(58) Field of Classification Search
CPC ................................ G06F 9/44; G06F 11/3409
See application file for complete search history.

(56) References Cited

U.S. PATENT DOCUMENTS

| 7,506,312 | B1 * | 3/2009 | Girolami-Rose | ......... G06F 8/71 |
|---|---|---|---|---|
| | | | | 717/101 |
| 9,049,079 | B2 | 6/2015 | Sasatani | |
| 9,176,759 | B1 | 11/2015 | Sahasranaman et al. | |
| 2005/0120111 | A1 | 6/2005 | Bailey et al. | |
| 2006/0130044 | A1 | 6/2006 | Avritzer et al. | |
| 2007/0061626 | A1 | 3/2007 | Nelson et al. | |
| 2008/0270071 | A1 * | 10/2008 | Marvasti | ............ G05B 23/0221 |
| | | | | 702/179 |
| 2009/0217282 | A1 | 8/2009 | Rai et al. | |
| 2011/0054875 | A1 * | 3/2011 | Chang | ................. G06F 17/5036 |
| | | | | 703/14 |
| 2011/0195415 | A1 * | 8/2011 | Waldman | ............. C12Q 1/6883 |
| | | | | 435/6.12 |
| 2013/0151179 | A1 * | 6/2013 | Gray | ...................... G01D 4/002 |
| | | | | 702/62 |

(Continued)

OTHER PUBLICATIONS

International Search Report and Written Opinion for the related Application No. PCT/US2017/052388 dated Dec. 21, 2017.

*Primary Examiner* — Mohammed H Rehman
(74) *Attorney, Agent, or Firm* — Honigman Miller Schwartz and Cohn LLP

(57) ABSTRACT

A method includes receiving samples of data over a time range from a start time to an end time, determining a mean/median of the data samples within a historic time window, and determining a mean/median of the data samples within a recent time window. The method also includes determining a data sample delta based on a difference between the mean/median of the data samples within the recent time window and the mean/median of the data samples within the historic time window. The method also includes determining whether the data sample delta exceeds a delta tolerance, and when the data sample delta exceeds the delta tolerance, determining a regression in performance. The method also includes transmitting a regression alert to a user device. The user device is configured to notify a user associated with the user device of the regression in performance.

24 Claims, 7 Drawing Sheets

(56) References Cited

U.S. PATENT DOCUMENTS

2014/0325480 A1\* 10/2014 Bhagavatula ....... G06F 11/3688
717/124
2015/0339207 A1   11/2015 Hod
2015/0347282 A1   12/2015 Wingfors et al.
2016/0132669 A1\*  5/2016 Pathangay .............. G06F 21/32
726/19

\* cited by examiner

WINDOW DEVIATION ANALYZER

TECHNICAL FIELD

This disclosure relates to determining performance regressions for a remote system.

BACKGROUND

A distributed system (e.g., cloud environment) generally includes many loosely coupled computers, each of which typically includes a computing resource (e.g., one or more computer processors) and/or storage resources (e.g., memory, flash memory, and/or disks). A distributed storage system may overlay a storage abstraction (e.g., key/value store or file system) on the storage resources. Moreover, a server process running on one or more of the computers can export its capabilities to client processes running on other computers. The client processes result in a load on the computing resources and/or the storage resources. A distributed system typically warrants extensive monitoring and management to deliver expected performance and reliability.

SUMMARY

A distributed system may experience a regression in performance when the distributed system is still operational, but available capacity for the distributed system is degraded and/or reduced. Developers that create software applications or services for execution on the distributed system often lack tools for identifying and rectifying performance regressions at any stage during the development cycle. As a result, developers often identify performance regressions long after integrating offending portions of code, thereby leaving the developers with the onerous task of working backward to track performance regressions. This task is difficult and costly, and may be nearly impossible to track a point or cause of a performance regression. The present disclosure provides systems and methods for identifying performance regressions.

One aspect of the disclosure provides a method for determining a regression in performance. The method includes receiving, at data processing hardware, samples of data over a time range from a start time to an end time and determining, by the data processing hardware, a mean/median of the data samples within a historic time window extending from the start time to an intermediate time between the start time and the end time. The method also includes: determining, by the data processing hardware, a mean/median of the data samples within a recent time window extending from the intermediate time to the end time; determining, by the data processing hardware, a data sample delta based on a difference between the mean/median of the data samples within the recent time window and the mean/median of the data samples within the historic time window; and determining whether the data sample delta exceeds a delta tolerance. When the data sample delta exceeds the delta tolerance, the method includes determining, by the data processing hardware, a regression in performance and transmitting a regression alert from the data processing hardware to a user device in communication with the data processing hardware. The user device is configured to notify a user associated with the user device of the regression in performance in response to receiving the regression alert.

Implementations of the disclosure may include one or more of the following optional features. In some implementations, the method includes receiving a tolerance configuration at the data processing hardware from the user device. The tolerance configuration may identify a delta tolerance type and include the user-defined tolerance constraints for the identified tolerance type. The method may also include determining, by the data processing hardware, the delta tolerance for the identified tolerance type based upon the user-defined tolerance constraints and the mean/median of the data samples within the historic time window. The identified tolerance type may include a mean-based delta tolerance and the user-defined tolerance constraints may include at least one of a constant term, a mean coefficient, or a standard deviation coefficient. The identified tolerance type may also include a median-based delta tolerance and the user-defined tolerance constraints may include at least one of a constant term, a median coefficient, or a median absolute deviation coefficient. The received tolerance configuration may further indicate a directional bias for the data sample delta including one of an ignore increase bias or an ignore decrease bias.

In some examples, when the directional bias for the data sample delta includes the ignore increase bias and when the data sample delta exceeds the delta tolerance, the method includes determining, by the data processing hardware, whether the data sample delta is greater than zero or less than zero. When the data sample delta is greater than zero, the method may include determining, by the data processing hardware, no regression in performance exists. When the data sample delta is less than zero, the method may include determining the regression in performance and transmitting the regression alert from the data processing hardware to the user device.

When the directional bias for the data sample delta includes the ignore decrease bias and when the data sample delta exceeds the delta tolerance, the method may include determining, by the data processing hardware, whether the data sample delta is greater than zero or less than zero. When the data sample delta is greater than zero, the method may include determining the regression in performance and transmitting the regression alert from the data processing hardware to the user device. When the data sample delta is less than zero, the method may include determining, by the data processing hardware, no regression in performance exists. Each received data sample may include a duration of time for a service executing on the data processing hardware to retrieve a data file having a specified capacity from memory hardware in communication with the data processing hardware.

In some examples, the method includes receiving, at the data processing hardware, an update for a service executing on the data processing hardware from the user device and setting, by the data processing hardware, the intermediate time between the start time and the end time equal to a time of when the update for the service was received from the user device. The user device, in response to receiving the regression alert from the data processing hardware, may be configured to render regression notification for display upon a graphical user interface executing on the user device. The regression notification may notify the user associated with the user device of the regression in performance. The user device, in response to receiving the regression alert from the data processing hardware, may be configured to control one or more speakers of the user device to produce an audio signal associated with the alert signal, the audio signal notifying the user associated with the user device of the regression in performance. The historic time window and the recent time window may include different times, and may be substantially the same size.

Another aspect of the disclosure provides a system for determining a regression in performance. The system includes data processing hardware of a distributed system and memory hardware in communication with the data processing hardware. The memory hardware stores instructions that when executed on the data processing hardware cause the data processing hardware to perform operations. The operations include receiving samples of data over a time range from a start time to an end time, determining a mean/median of the data samples within a historic time window extending from the start time to an intermediate time between the start time and the end time, and determining a mean/median of the data samples within a recent time window extending from the intermediate time to the end time. The operations also include determining a data sample delta based on a difference between the mean/median of the data samples within the recent time window and the mean/median of the data samples within the historic time window and determining whether the data sample delta exceeds a delta tolerance. When the data sample delta exceeds the delta tolerance, the operations include determining a regression in performance and transmitting a regression alert to a user device in communication with the data processing hardware. The user device is configured to notify a user associated with the user device of the regression in performance in response to receiving the regression alert.

In some implementations, the operations include receiving a tolerance configuration from the user device and determining the delta tolerance for the identified tolerance type based upon the user-defined tolerance constraints and the mean/median of the data samples within the historic time window. The tolerance configuration may identify a delta tolerance type and include the user-defined tolerance constraints for the identified tolerance type. The identified tolerance type may include a mean-based delta tolerance and the user-defined tolerance constraints may include at least one of a constant term, a mean coefficient, or a standard deviation coefficient. The identified tolerance type may also include a median-based delta tolerance and the user-defined tolerance constraints may include at least one of a constant term, a median coefficient, or a median absolute deviation coefficient. The received tolerance configuration may also indicate a directional bias for the data sample delta comprising one of an ignore increase bias or an ignore decrease bias.

The operations may also include, when the directional bias for the data sample delta includes the ignore increase bias and when the data sample delta exceeds the delta tolerance, determining whether the data sample delta is greater than zero or less than zero. When the data sample delta is less than zero, the operations may include determining the regression in performance and transmitting the regression alert from the data processing hardware to the user device. When the directional bias for the data sample delta includes the ignore decrease bias and when the data sample delta exceeds the delta tolerance, the operations may include determining, by the data processing hardware, whether the data sample delta is greater than zero or less than zero. When the data sample delta is greater than zero, the operations may include determining the regression in performance and transmitting the regression alert from the data processing hardware to the user device. When the data sample delta is less than zero, the operations may include determining no regression in performance exists. Each received data sample may include a duration of time for a service executing on the data processing hardware to retrieve a data file having a specified capacity from memory hardware in communication with the data processing hardware.

In some implementations, the operations include receiving an update for a service executing on the data processing hardware from the user device and setting the intermediate time between the start time and the end time equal to a time of when the update for the service was received from the user device. In response to receiving the regression alert from the data processing hardware, the user device may be configured to render regression notification for display upon a graphical user interface executing on the user device. The regression notification may notify the user associated with the user device of the regression in performance. In response to receiving the regression alert from the data processing hardware, the user device may also be configured to control one or more speakers of the user device to produce an audio signal associated with the alert signal. The audio signal may notify the user associated with the user device of the regression in performance. The historic time window and the recent time window may include different sizes. Additionally or alternatively, the historic time window and the recent time window may include substantially the same size.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 7:
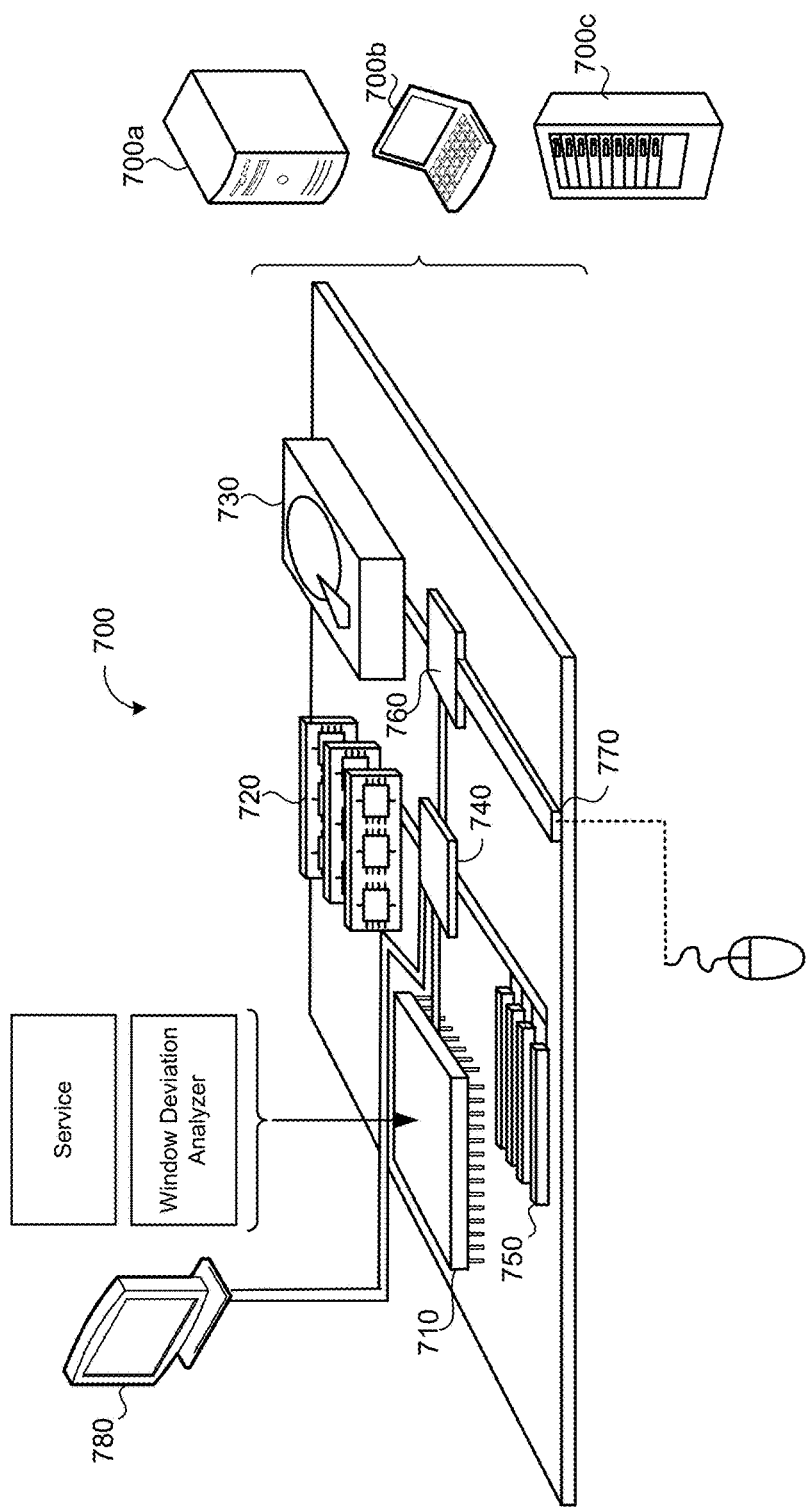
FIG. 7 is a schematic view of an example computing device executing a window deviation an analyzer.

A window deviation analyzer may analyze data samples within a historic time window against data samples in a recent time window to detect performance regressions on a distributed system in the presence of noise. The window deviation analyzer may rely on tolerance constraints having values defined by a user to determine a tolerance, that when exceeded by a magnitude of change in the recent data samples from the historic data samples, causes the window deviation analyzer to detect a performance regression. The window deviation analyzer may transmit a regression alert to a user (e.g., developer) to inform the user of the detected performance regression. Accordingly, the window deviation analyzer may automatically detect a performance regression and notify the user so that the user can rectify the performance regression before fully integrating portions of code associated with the performance regression to services/applications executing on the distributed system, Referring to FIGS. 1 and 2, in some implementations, a system 100 includes a user device 110 associated with a user 10, who may communicate, via a network 130, with a remote system 140. The remote system 140 may be a distributed system (e.g., cloud environment) having scalable/elastic resources 142. The resources 142 include computing resources 144 and/or storage resources 146. The remote system 140 may include a distributed storage system having a scalable/elastic non-transitory datastore 150 for storing data files 205 thereon. In some examples, the remote system 140 executes one or more services 170 that manage access to the datastore 150 and the data files 205 stored thereon. The service(s) 170 may execute on data processing hardware 700 (FIG. 7).

In some implementations, the data processing hardware 700 executes a window deviation analyzer (WDA) 160 that analyzes samples of data 202 within a historic time window 210 on a plot 200 against samples of the data 202 within a recent time window 220 on the plot 200. The WDA 160 may receive a tolerance configuration 300 from the user device 110 for use by the WDA 160 in determining a delta tolerance. The delta tolerance may include a tolerance type 302 (FIGS. 3A and 3B) corresponding to one of a mean-based delta tolerance $T_{Mean}$ or a median-based delta tolerance $T_{Median}$, or some other metric-based delta tolerance.

Figure 1:
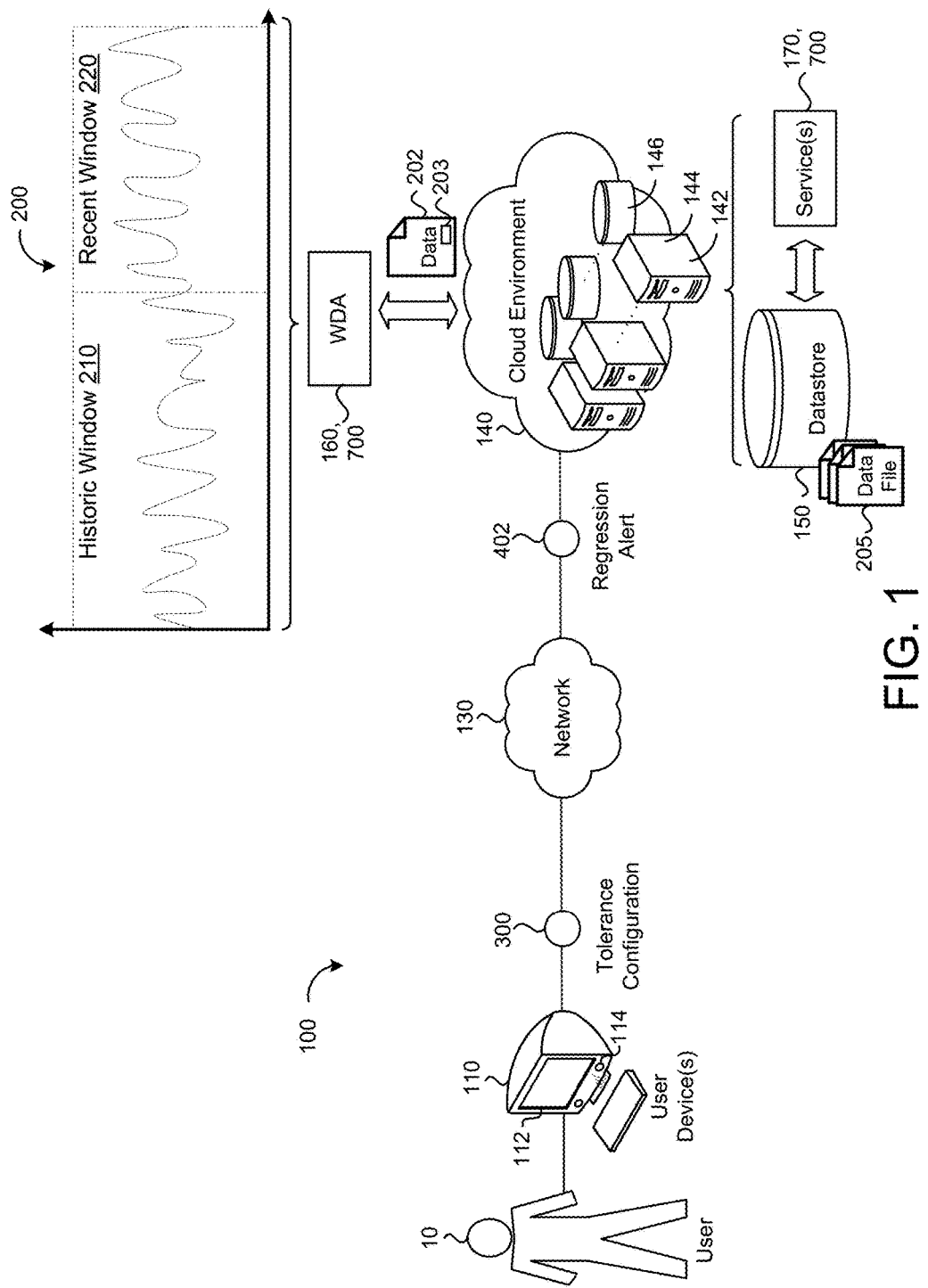
FIG. 1 is a schematic view of an example system for transmitting a regression alert in response to determining a regression in performance.

In some implementations, the WDA 160 determines a regression in performance on the remote system 140 when a mean or median of the data samples 202 within the recent time window 220 deviate from a corresponding mean or median of the data samples 202 within the historic time window 210 by a magnitude that exceeds the corresponding mean-based delta tolerance $T_{Mean}$ or median-based delta tolerance $T_{Median}$. Accordingly, the delta tolerance may define a threshold value that allows for some deviation between the samples of the data 202 within the historic and recent time windows 210, 220, respectively. FIG. 1 shows the WDA 160 transmitting a regression alert 402 to the user device 110 when the WDA 160 determines the regression in performance. The user device 110 is configured to notify the user 10 of the regression in performance in response to receiving the regression alert 402. In some examples, the user device 110 renders a regression notification 450 (FIG. 4A) for display on a graphical user interface (GUI) 112 executing on the user device 110 that notifies the user 10 of the regression in performance. Additionally or alternatively, the user device 110 may control one or more speakers 114 to produce an audio signal 452 (FIG. 4A) associated with the regression alert 402 to notify the user 10 of the regression in performance.

Figure 2:
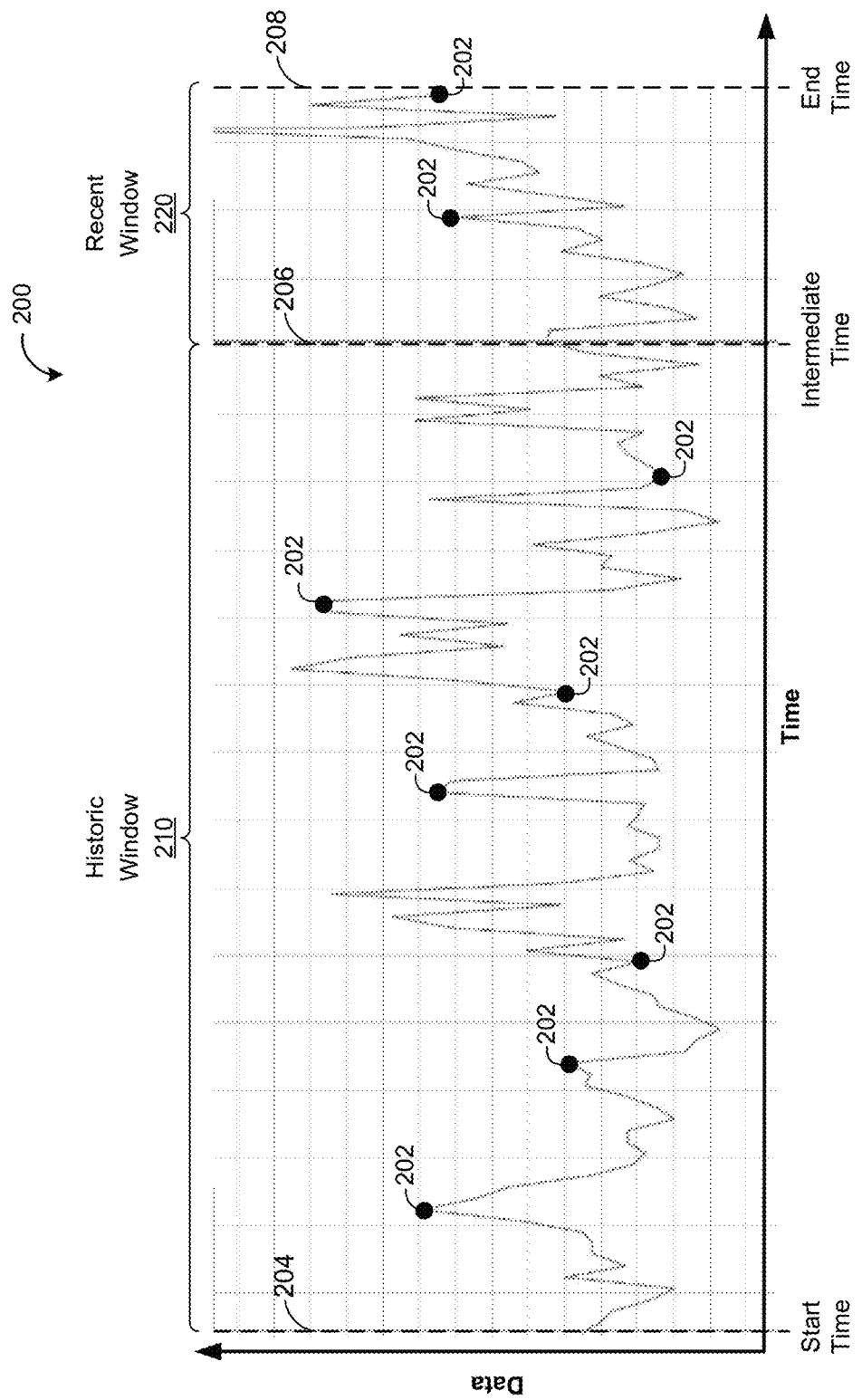
FIG. 2 is a schematic view of an example plot of data samples within a within a historic time window extending from a start time to an intermediate time, and a recent time window extending from the intermediate time to an end time.

FIG. 2 shows the plot 200 of data samples 202 received by the WDA 160 over a time range from a start time 204 to an end time 208. The vertical y-axis denotes a specified metric for the data 202 and the horizontal x-axis denotes time increasing from left to right. Accordingly, each data sample 202 includes a corresponding timestamp 203 (FIG. 1) and a corresponding value of the specified metric for the data 202. In some examples, the specified metric is associated with one or more performance metrics measured by the WDA 160 (and/or service 170) while executing a performance test on the remote system 140. For instance, each data sample may be associated with a conglomerate of different performance metrics that, when taken alone, are not comparable with one another. In one example, the specified metric for each data sample 202 corresponds to a duration of time for the service 170 to retrieve a 100 Megabytes (MB) data file 205 from the datastore 150. In another example, the specified metric for each data sample 202 corresponds to a duration of time for the service 170 to execute a process (e.g., algorithm). In some implementations, the end time 208 corresponds to a current time.

The historic time window 210 extends from the start time 204 to an intermediate time 206 between the start time 204 and the end time 208. The recent time window 220 extends from the intermediate time 206 to the end time 208. Accordingly, each data sample 202 is time ordered and located within one of the historic time window 210 or the recent time window 220 such that each data sample 202 within the historic time window 210 is associated with an earlier time (e.g., smaller timestamp 203) than the data samples 202 within the recent time window 220. In some examples, the historic time window 210 represents a time range that benchmarks a set of data samples 202 deemed normal. In these examples, the recent time window 220 may or may not commence immediately successive to when the historic time window 210 ends. The plot 200 of FIG. 2 shows the historic time window 210 spanning a longer time range than the recent time window 220. However, the recent time window 220 may increase while a corresponding performance test continues to execute on the WDA 160 or service 170. Accordingly, the historic time window 210 and the recent time window 220 may include substantially the same or different sizes.

Referring to FIGS. 1 and 2, in some implementations, the WDA 160 determines a historic mean of the data samples 202 within the historic time window 210 and determines a recent mean of the data samples 202 within the recent time window 220. Thereafter, the WDA 160 determines a data sample delta based on a difference between the recent mean of the data samples 202 within the recent time window 220 and the historic mean of the data samples 202 within the historic time window 210, and then determines if an absolute value of the data sample delta exceeds the mean-based delta tolerance $T_{Mean}$ based in part by the tolerance configuration 300 received from the user device 110. When an absolute value of the data sample delta exceeds the $T_{Mean}$, the WDA 160 may determine the regression in performance and transmit the regression alert 402 to the user device 110 to notify the user 10 of the regression in performance. The WDA 160 may calculate a mean-based regression in performance in accordance with the following equation:

$$RIP=(abs(R_{mean}-H_{Mean}))>T_{Mean} \quad (1A)$$

where RIP is a regression in performance, $R_{Mean}$ is a recent mean of the data samples 202 within the recent time window 220, and $H_{Mean}$ is a mean of the data samples 202 within the historic time window 210. The user device 110, or user 10 associated with the user device 110, may take appropriate action to resolve the regression in performance on the remote system 140.

In additional implementations, the WDA 160 determines a historic median of the data samples 202 within the historic time window 210 and determines a recent median of the data samples 202 within the recent time window 220. In these implementations, the WDA 160 determines the data sample delta based on a difference between the recent median of the data samples 202 within the recent time window 220 and the historic median of the data samples 202 within the historic time window 210, and then determines if the data sample delta exceeds the median-based delta tolerance $T_{Median}$ based in part by the tolerance configuration 300 received from the user device 110. In some scenarios, the WDA 160 determines the regression in performance when an absolute value of the data sample delta exceeds the $T_{Median}$, and transmits the regression alert 402 to the user device 110 to notify the user 10 of the regression in performance. The WDA 160 may calculate a median-based regression in performance in accordance with the following equation:

$$\text{RIP} = (\text{abs}(R_{Median} - H_{Median})) > T_{Median} \quad (1B)$$

where $R_{Median}$ is the recent median of the data samples 202 within the recent time window 220 and $H_{Median}$ is the median of the data samples 202 within the historic time window 210. While the WDA 160 may determine the data sample delta based on the mean/median of the data samples 202 within the historic and recent time windows 210, 220, respectively, the WDA 160 may determine other metrics such as, but not limited to, a standard deviation and/or some percentile of the specified metric associated with the data samples 202 for use in determining whether or not deviations exist between the two time windows 210 and 220.

Figure 3A:
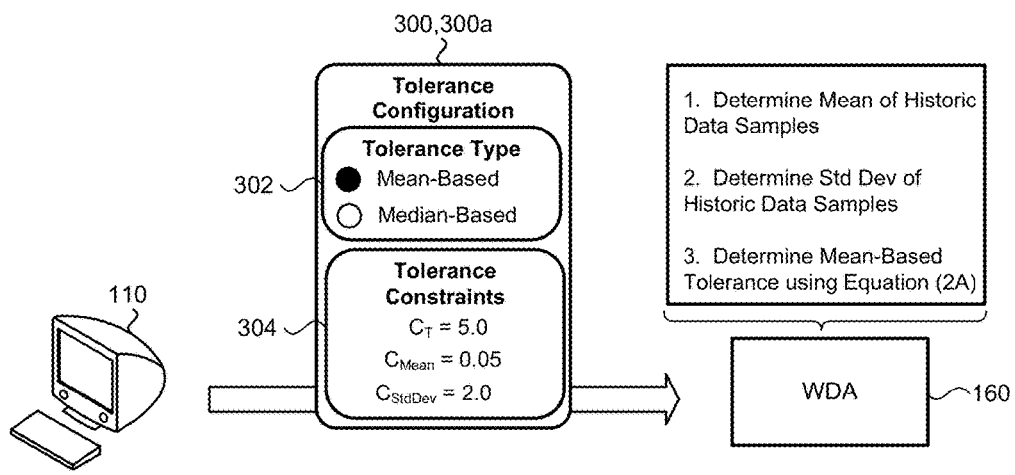
FIGS. 3A and 3B show schematic views of a user device transmitting a tolerance configuration to a window deviation analyzer for determining a delta tolerance.
Figure 3B:
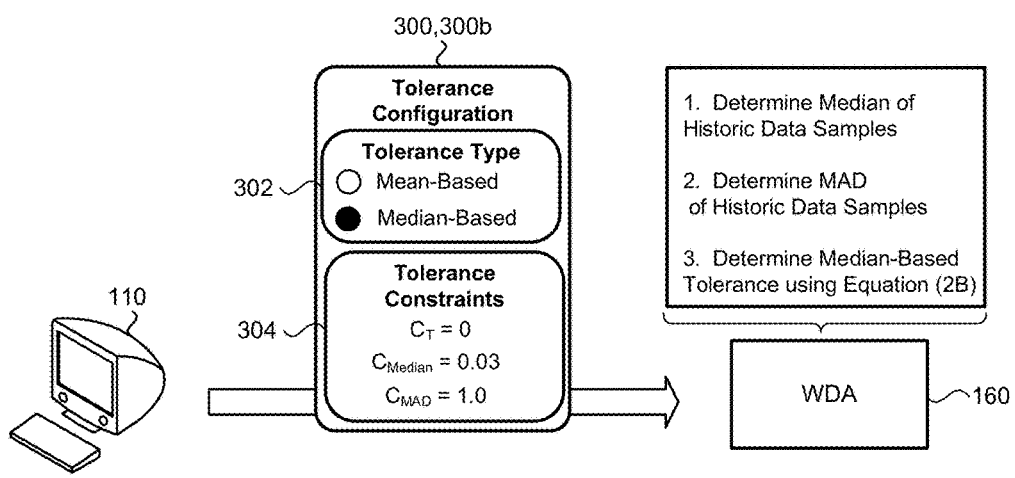

Referring to FIGS. 3A and 3B, in some implementations, the WDA 160 receives a tolerance configuration 300, 300a-b from the user device 110 that identifies the delta tolerance type 302 and one or more tolerance constraints 304 for use in determining the delta tolerance specified by the delta tolerance type 302. The tolerance constraints 304 may be defined by the user 10 associated with the user device 110 to customize how large of a deviation between the data samples 202 within the historic and recent time windows 210, 220, respectively, is required for the WDA 160 to determine the regression in performance. For instance, the tolerance constraints 304 may define a minimum tolerance, an allowable percentage of change from the data samples 202 in the historic time window 210, and/or account for noise within the historic time window 210. The WDA 160 may determine the delta tolerance (e.g., $T_{mean}$ or $T_{Median}$) for the identified tolerance type 302 based upon the one or more tolerance constraints 304 and the mean/median of the data samples 202 within the historic time window 210. As used herein, the term 'historic data samples 202' may be used to refer to the data samples 202 within the historic time window 210 of the plot 200 of FIGS. 1 and 2.

FIG. 3A shows the WDA 160 receiving the tolerance configuration 300a identifying the delta tolerance type 302 as the mean-based delta tolerance $T_{Mean}$ and the user-defined tolerance constraints 304 including a constant term $C_T$, a mean coefficient $C_{Mean}$, and a standard deviation coefficient $C_{StdDev}$. When the WDA 160 receives the tolerance configuration 300a from the user device 110, the WDA 160 determines the historic mean ($H_{Mean}$) of the historic data samples 202, determines a historic standard deviation of the historic data samples 202, and determines the mean-based delta tolerance $T_{Mean}$ in accordance with the following equation:

$$T_{Mean} = C_T + (C_{Mean} \times H_{Mean}) + (C_{StdDev} \times H_{StdDev}) \quad (2A)$$

where $H_{StdDev}$ is a historic standard deviation of the historic data samples 202, i.e., the standard deviation of the data samples 202 within the historic time window 210 of plot 200.

The constant term $C_T$ is operative as a fixed term within EQ. 2A while the second term associated with the $C_{Mean}$ and the third term associated with the $C_{StdDev}$ may vary with the values of the historic data samples 202. In some scenarios, each of the mean coefficient $C_{Mean}$ and the standard deviation coefficient $C_{StdDev}$ are set to zero while the constant term $C_T$ is set to a non-zero integer. Here, the constant term $C_T$ defines a fixed tolerance for the mean-based delta tolerance $T_{Mean}$. The use of only the $C_T$ for determining the mean-based delta tolerance in EQ. 2A may be useful when the historic data samples 202 are relatively noise-free. On the other hand, the $C_T$ is associated with a minimum tolerance for the mean-based delta tolerance $T_{Mean}$ of EQ. 2A when the mean coefficient $C_{Mean}$ and/or the standard deviation coefficient $C_{StdDev}$ is also set to a non-zero integer. The value of $C_T$ may define the delta tolerance when the historic data samples 202 are associated with lower magnitudes. For example, if a typical metric for a latency operation is 10 milliseconds (ms), a 50-percent (50%) increase in this latency may not warrant a regression in performance. Accordingly, setting the constant term $C_T$ to 5 ms would prevent the WDA 160 from determining the regression in performance, regardless of what the other user-defined constraints 304 (e.g., $C_{Mean}$ and/or $C_{StdDev}$) are set to for use by EQ. 2A in calculating the mean-based delta tolerance $T_{Mean}$. FIG. 3A shows the $C_T$ set to five (5).

The mean coefficient $C_{Mean}$ is operative to set a tolerance based on a percent deviation from the historic mean $H_{Mean}$ of the data samples 202 within the historic time window 210. For instance, setting the mean coefficient $C_{Mean}$ to a value equal to 0.05 requires the recent mean $R_{Mean}$ of the data samples 202 within the recent time window 220 to deviate by more than five-percent (5%) from the historic mean $H_{Mean}$ of the data samples 202 within the historic time window 210 before the WDA 160 may warrant a regression in performance, i.e., presuming values for $C_T$ and $C_{StdDev}$ are set to zero. In some scenarios, when the historic data samples 202 are relatively noise-free, the constant term $C_T$ and the standard deviation coefficient $C_{StdDev}$ may be set to zero, while the mean coefficient $C_{Mean}$ may be set to a non-zero integer (e.g., 0.05). The $C_{Mean}$ may be set to any percentage of acceptable change/deviation from the historic mean $H_{Mean}$ of the data samples 202 within the historic time window 210. FIG. 3A shows the $C_{Mean}$ set to a value equal to 0.05.

In some implementations, the user-defined constraints 304 include the standard deviation coefficient $C_{StdDev}$ set to a non-zero integer to add an amount of tolerance associated with noise about the historic mean $H_{Mean}$ of the data samples 202 within the historic time window 210. Generally, the standard deviation coefficient $C_{StdDev}$ is set to a non-zero integer when the constant term $C_T$ and/or the mean coefficient $C_{Mean}$ is also set to a non-zero integer. Unless the historic data samples 202 received by the WDA 160 are guaranteed to have noise, using only the standard deviation coefficient $C_{StdDev}$ in EQ. 2A is not recommended because the $H_{StdDev}$ may approach zero, and therefore, become too sensitive to minor changes/deviations in the recent data samples 202 from the historic data samples 202. As twice the standard deviation is a typical metric for use in defining a margin of error in a normal distribution, the standard deviation coefficient $C_{StdDev}$ may be set to a recommended value equal to two (2.0). Thus, about 95-percent (95%) of the data samples 202 within the historic time window 210 will fall in a range equal to the $H_{Mean}$ plus/minus 2.0 multiplied by the $H_{StdDev}$. FIG. 3A shows the $C_{StdDev}$ set to 2.0. In other examples, the standard deviation coefficient $C_{StdDev}$ may include a value within the range from 1.0 to 2.0.

FIG. 3B shows the WDA 160 receiving the tolerance configuration 300b identifying the delta tolerance type 302 as the median-based delta tolerance $T_{Median}$ and the user-defined tolerance constraints 304 including at least one of the constant term $C_T$, a median coefficient $C_{Median}$, or a median absolute deviation coefficient $C_{MAD}$. When the WDA 160 receives the tolerance configuration 300b from the user device 110, the WDA 160 determines the historic median ($H_{Median}$) of the historic data samples 202, determines a median absolute deviation of the historic data samples 202, and determines the mean-based delta tolerance $T_{Mean}$ in accordance with the following equation:

$$T_{Median}=C_T+(C_{Median}\times H_{Median})+(C_{MAD}\times H_{MAD}) \quad (2B)$$

where $H_{MAD}$ is the median absolute deviation of the historic data samples 202, i.e., the median absolute deviation of the data samples 202 within the historic time window 210 of plot 200.

As with EQ. 2A, the constant term $C_T$ is operative as a fixed term within EQ. 2B while the second term associated with the $C_{Median}$ and the third term associated with the $C_{MAD}$ may vary with the values of the historic data samples 202. In some scenarios, the constant term $C_T$ is operative as a fixed tolerance for the median-based delta tolerance $T_{Median}$ when the user-defined tolerance constraints 304 include the median coefficient $C_{Median}$ and the median absolute deviation coefficient $C_{MAD}$ set to zero, while the constant term $C_T$ is set to a non-zero integer. In other scenarios, the $C_T$ is associated with a minimum tolerance for the median-based delta tolerance $T_{Median}$ of EQ. 2B when the user-defined tolerance constraints 304 include the median coefficient $C_{Median}$ and/or the mean absolute deviation coefficient $C_{MAD}$ also set to a non-zero integer. FIG. 3B shows the constant term $C_T$ set to zero (0).

The median coefficient $C_{Median}$ is operative to set a tolerance based on a percent deviation from the historic median $H_{Median}$ of the data samples 202 within the historic time window 210. For instance, setting the mean coefficient $C_{Median}$ to a value equal to 0.03 requires the recent median $R_{median}$ of the data samples 202 within the recent time window 220 to deviate by more than five-percent (3%) from the historic median $H_{Median}$ of the data samples 202 within the historic time window 210 before the WDA 160 may warrant a regression in performance, i.e., presuming values for $C_T$ and $C_{MAD}$ are set to zero. In some scenarios, when the historic data samples 202 are relatively noise-free, the user-defined tolerance constraints 304 include the constant term $C_T$ and the median absolute deviation coefficient $C_{MAD}$ set to zero and the median coefficient $C_{Median}$ set to a non-zero integer (e.g., 0.03). As with the $C_{Mean}$ of EQ. 2A, the user 10 may set, i.e., via the user-defined tolerance constraints 304 of the tolerance configuration 300, the $C_{Median}$ to any percentage of acceptable change from the historic median $H_{Median}$ of the data samples 202 within the historic time window 210. FIG. 3B shows the $C_{Median}$ set to a value equal to 0.03.

In some implementations, the user-defined constraints 304 include the median absolute deviation coefficient $C_{MAD}$ set to a non-zero integer to add an amount of tolerance associated with noise about the historic median $H_{Median}$ of the data samples 202 within the historic time window 210. As with standard deviation, a median absolute deviation similarly provides a measure of variability for a distribution of data 202. However, the median absolute deviation focuses on median values and typically provides a more robust measurement of variability compared to standard deviation. Generally, the median absolute deviation coefficient $C_{MAD}$ is set to a non-zero integer when the constant term $C_T$ and/or the median coefficient $C_{Median}$ is also set to a non-zero integer to serve as a margin of error about the historic median $H_{Median}$. Unless the historic data samples 202 received by the WDA 160 are guaranteed to have noise, use of the median absolute deviation coefficient $C_{MAD}$ in EQ. 2B by itself is not recommended because the $H_{MAD}$ may approach zero, and therefore, become too sensitive to minor changes/deviations in the recent data samples 202. As half of all data samples 202 within the historic time window 210 typically fall within acceptable noise levels, the median absolute deviation coefficient $C_{MAD}$ may be set to a recommended value equal to one (1.0). Thus, about 50-percent (50%) of the data samples 202 within the historic time window 210 will fall in a range equal to the $H_{Median}$ plus/minus 1.0 multiplied by the $H_{MAD}$. FIG. 3B shows the $C_{MAD}$ set to 1.0. Larger time windows are less affected by noise. Accordingly, in some examples, the $C_{MAD}$ is set to 0.0 when the time range for the recent time window 220 is large enough to not be affected by noise.

Figure 4A:
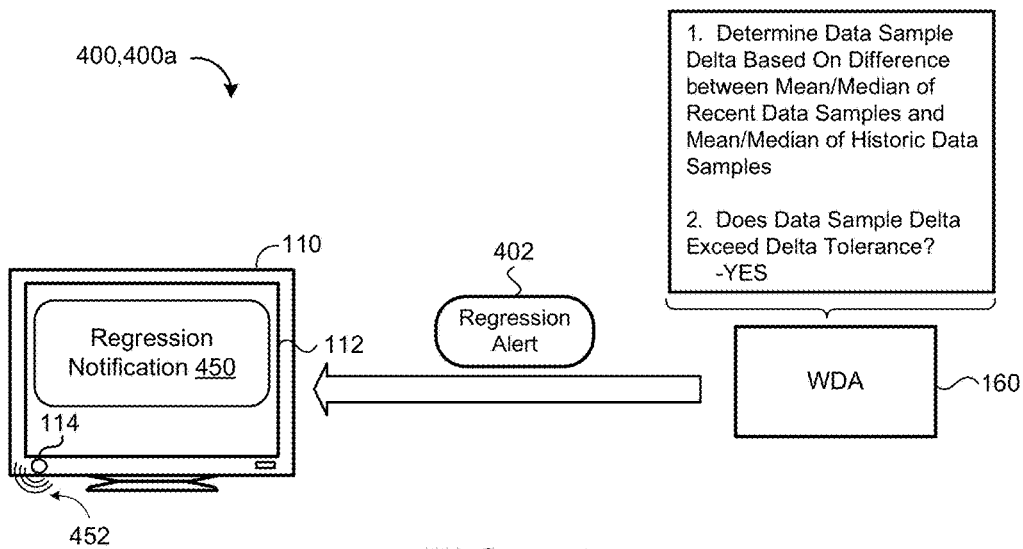
FIG. 4A shows a schematic view of a window deviation analyzer transmitting a regression alert to a user device when a data sample delta exceeds a delta tolerance.

Referring to FIG. 4A, in some implementations, the WDA 160 transmits the regression alert 402 in response to determining the data sample delta exceeds the delta tolerance. For instance, when the received tolerance configuration 300 indicates the mean-based delta tolerance $T_{Mean}$, the WDA 160 determines a mean-based data sample delta based on a difference between the recent mean $R_{Mean}$ of the data samples 202 within the recent time window 220 and the historic mean $H_{Mean}$ of the data samples 202 within the historic time window 210. Thereafter, the WDA 160 uses EQ. 1A to determine whether the data sample delta exceeds the mean-based delta tolerance $T_{Mean}$. When the data sample delta (e.g., abs($R_{Mean}-H_{Mean}$)) exceeds the $T_{Mean}$, the WDA 160 determines the regression in performance and subsequently transmits the regression alert 402 to the user device 110. The regression alert 402 indicates the regression in performance determined by the WDA 160. In some examples, the regression alert 402 is an email or text message sent to the user device 110.

In some examples, in response to receiving the regression alert 402 from the user device 110, the WDA 160 provides a regression notification 450 to the user 10 associated with the user device 110. The regression notification 450 informs the user 10 of the regression in performance on the remote system 140 based on the data samples 202 returned from performance testing. In some implementations, the user device 110 provides the regression notification 450 by displaying the regression notification 450 on the GUI 112 executing on the user device 110. Additionally or alternatively, the user device 110 may control the one or more speakers 114 to produce the audio signal 452 associated with the regression notification 450. That is, the audio signal 452 includes a special regression notification audio signal 452 to inform the user 10 of the regression in performance on the remote system 140 with or without the user 10 having to visually view the regression notification 450 upon the GUI 112. Thus, the regression alert 402 received at the user device 110 may prompt the user device 110 to display the visual regression notification 450 on the GUI 112 and/or prompt the user device 110 to control the speakers 114 to output the regression notification audio signal 452.

In some scenarios, performance testing resulting in the mean/median of the recent data samples 202 increasing or decreasing from the mean/median of the historic data samples 202 is desirable while the other one of increasing or decreasing may be associated with a regression in performance. For instance, the WDA 160 may determine that no regression in performance exists when a data sample delta (e.g., $R_{Mean}-H_{Mean}$) is greater than zero and, thus, associated with an increase from the historic data samples 202. Conversely, the WDA 160 may determine the regression in performance when the data sample delta exceeds the delta tolerance, but is less than zero and, thus, associated with a decrease from the historic data samples 202.

Figure 4B:
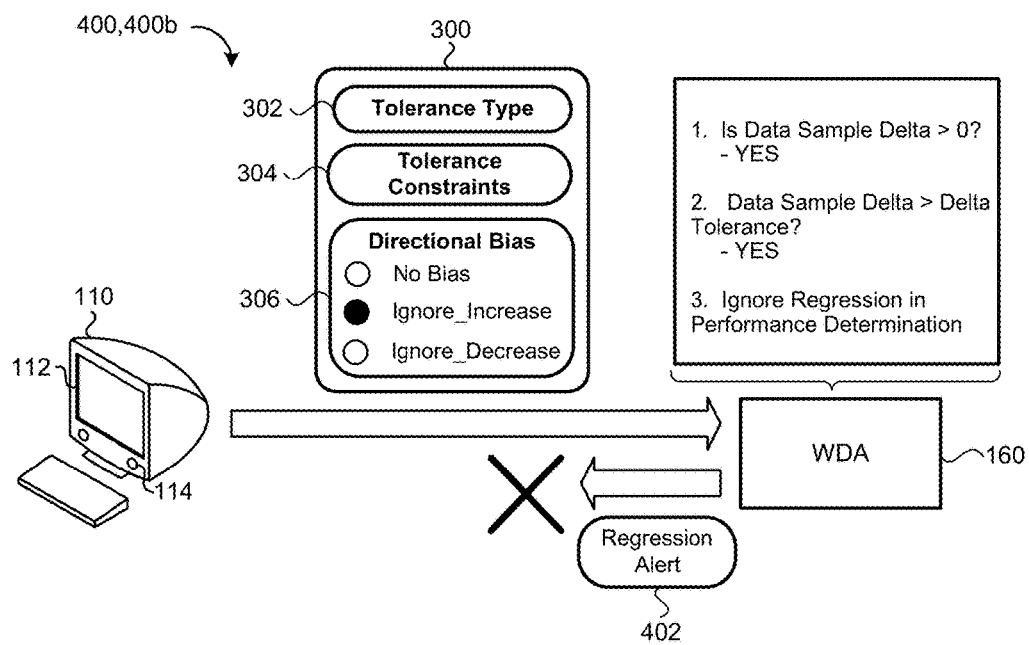
FIG. 4B shows a schematic view of a window deviation analyzer determining no regression in performance exists when a data sample delta is associated with a directional bias.

Referring to FIG. 4B, in some implementations, the WDA 160 receives the tolerance configuration 300 from the user device 110 indicating a directional bias 306 for the data sample delta, in addition to the delta tolerance type 302 and the one or more user-defined tolerance constraints 304. The directional bias 306 specifies one of an Ignore_Increase bias, an Ignore_Decrease bias, or no directional bias at all. The directional bias 306 may be defined by the user 10 to instruct the WDA 160 to determine no regression in performance exists when the mean/median of the recent data samples 202 deviates/changes from the mean/median of the historic data samples 202 in one of a positive (e.g., increasing) or negative (e.g., decreasing) direction.

The Ignore_Decrease bias instructs the WDA 160 to determine no regression in performance exists for recent data samples 202 decreasing from the historic data samples 202, even if the magnitude of deviation (e.g., data sample delta) exceeds the delta tolerance (e.g., $T_{Mean}$ or $T_{Median}$). However, the WDA 160 will still determine the regression in performance (e.g., via EQ. 1A or EQ. 1B) if the recent data samples 202 increase from the historic data samples 202 by a magnitude exceeding the delta tolerance when the directional bias 306 includes the Ignore_Decrease bias.

On the other hand, the Ignore_Increase bias instructs the WDA 160 to determine no regression in performance exists for recent data samples 202 increasing from the historic data samples 202, even if the magnitude of deviation (e.g., data sample delta) exceeds the delta tolerance (e.g., $T_{Mean}$ or $T_{Median}$). However, the WDA 160 will still determine the regression in performance (e.g., via EQ. 1A or EQ. 1B) if the recent data samples 202 decrease from the historic data samples 202 by a magnitude exceeding the delta tolerance when the directional bias 306 includes the Ignore_Increase bias. FIG. 4B shows the directional bias 306 specifying the Ignore_increase bias. Accordingly, when the WDA 160 determines that the data sample delta (e.g., ($R_{Mean}-H_{Mean}$) or ($R_{Median}-H_{Median}$)) is greater than zero, the WDA 160 determines no regression in performance exists despite the data sample delta exceeding the delta tolerance (e.g., $T_{Mean}$ or $T_{Media}$n). Accordingly, the WDA 160 will not transmit a regression alert 402 to the user device 110. On the other hand, if the directional bias 306 instead specified "No Bias" or Ignore_Decrease, the same data sample delta including a value greater than zero and exceeding the delta tolerance would cause the WDA 160 to determine the regression in performance and transmit the regression alert 402 to the user device 110.

Figure 5:
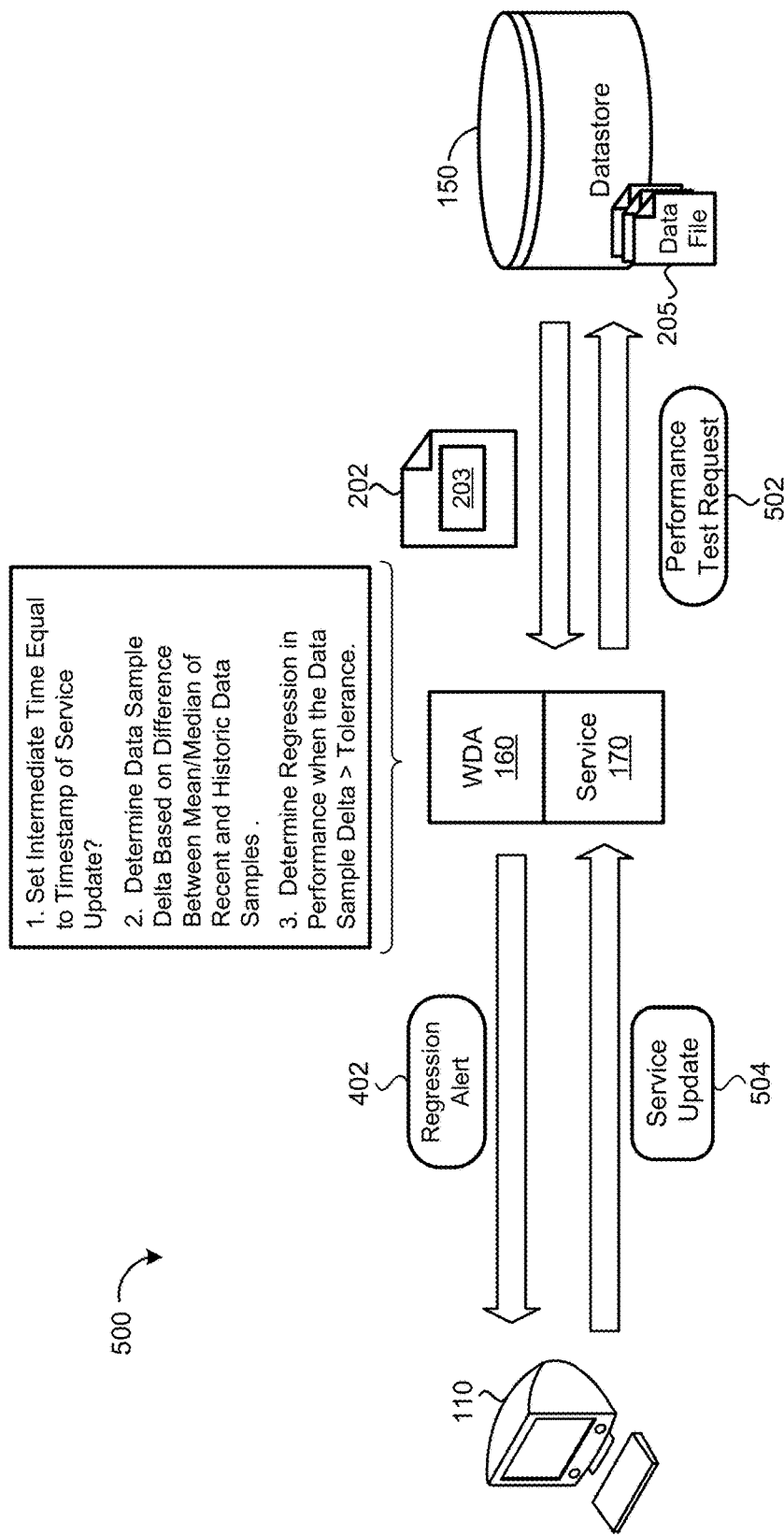
FIG. 5 shows a schematic view of window deviation analyzer transmitting a regression alert to a user device in response to determining a regression in performance.

FIG. 5 shows a schematic view 500 of the service 170 executing a performance test by measuring a duration of time to retrieve a specified capacity of a data file 205 from the non-transitory datastore 150 and reporting data samples 202 to the WDA 160 each indicating the duration of time and a corresponding timestamp 203 associated with the data sample 202. For instance, the service 170 may provide a performance test request 502 that measures the duration of time to retrieve the data file 205 of the specified capacity from the datastore 150. In some examples, the specified capacity includes a 100 MB data file 205. In other configurations, the performance test is associated with a micro-benchmark of a process executing on the service 170 that measures a duration of time for the service 170 to execute the process or measures some other metric associated with executing the process. The service 170 may continuously execute the performance test.

The WDA 160 may plot (e.g., via plot 200 of FIGS. 1 and 2) the values for the duration of time and the timestamp 203 associated with each received data sample 202 over a time range from a start time 204 to an end time 208 associated with a current time. The time range may dynamically increase as the end time 208 increases during execution of the performance test. While executing the performance test, FIG. 5 shows the service 170 receiving a service update 504 from the user device 110 configured to update a version and/or software code on the service 170. Concurrently, the WDA 160 sets an intermediate time 206 equal to a timestamp of the service update 504 on the service 170. In some examples, the WDA 160 distributes the data samples 202 received before the service update 504 into a historic time window 210 (FIG. 2) and distributes the data samples 202 received after the service update 504 into a recent time window 220 (FIG. 2). Here, the historic time window 210 extends between the start time 204 and the intermediate time 206 and the recent time window 220 extends between the intermediate time 206 and the end time 208. The WDA 160 may determine a mean/median of the data samples 202 within the historic time window 210 and determine a mean/median of the data samples 202 within the recent time window 220.

In some implementations, the WDA 160 benchmarks the service update 504 on the service 170 by determining a data sample delta based on a difference between the mean/median of the data samples 202 within the recent time window 220 and the mean/median of the data samples 202 within the historic time window 210. Thereafter, the WDA 160 determines whether the data sample delta exceeds a delta tolerance (e.g., $T_{Mean}$ or $T_{Median}$) based upon the mean/median of the historic data samples 202 and user-defined tolerance constraints 304 (FIGS. 3A and 3B). The determination of the delta tolerance is described above with reference to FIGS. 3A and 3B. When the data sample delta is greater than the delta tolerance, the WDA 160 determines a regression in performance and transmits the regression alert 402 to the user device 110. Accordingly, the WDA 160 determines that the service update 504 resulted in a degradation in performance to the service 170 based on a magnitude of change to the mean/median of the recent data samples 202 from the mean/median of the historic data samples 202. For instance, the duration of time for the service 170 to retrieve the data file 205 having the specified capacity from the datastore 150 after the service update 504 may be longer than the duration of time before the service update 504.

Figure 6:
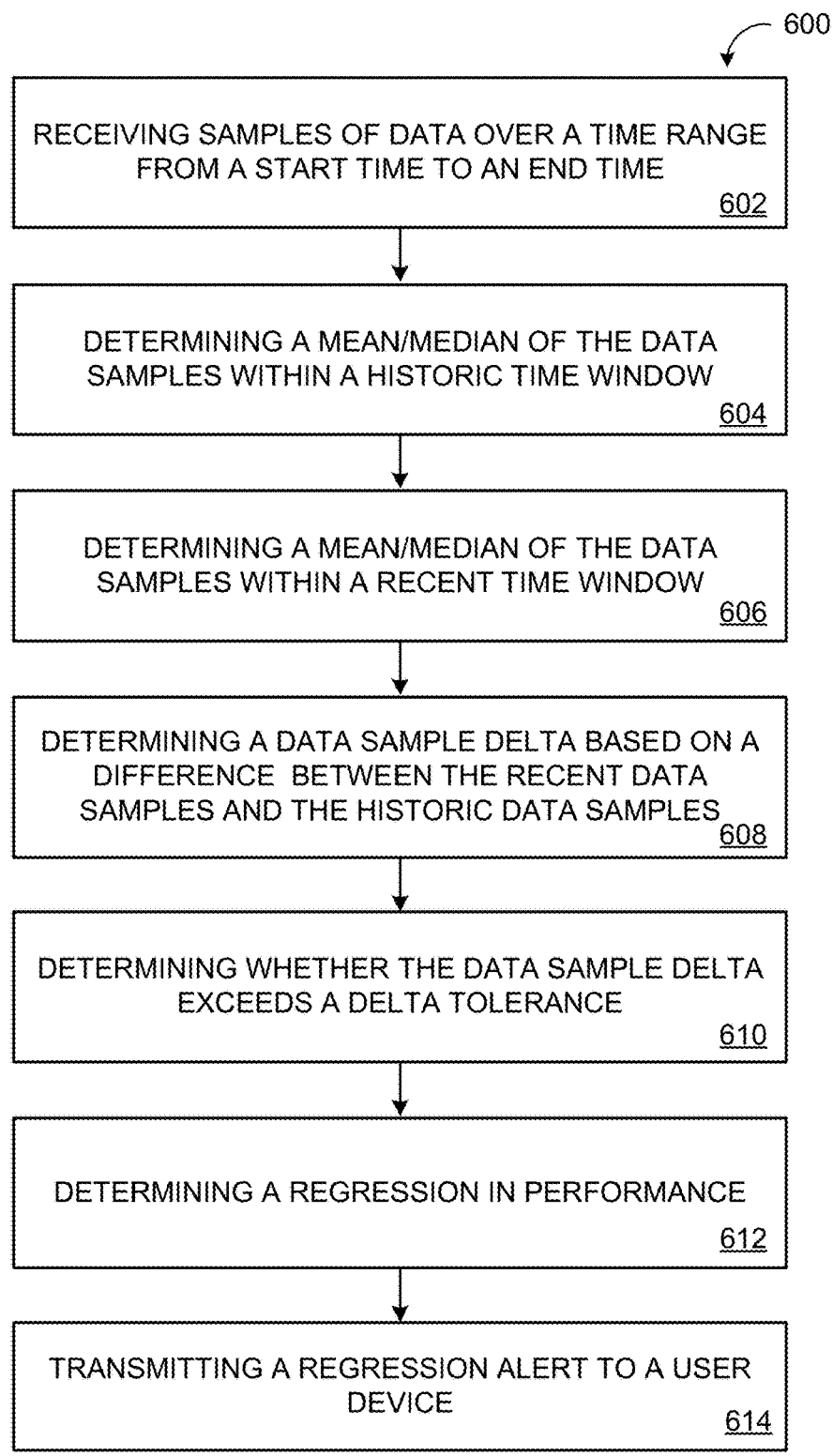
FIG. 6 is a flowchart of an example method for transmitting a regression alert in response to determining a regression in performance.

FIG. 6 provides an example arrangement of operations for a method 600 of determining a regression in performance on a system 140. At block 602, the method 600 includes receiving, at a window deviation analyzer (WDA) 160 executing on data processing hardware 700 (FIG. 7), samples of data 202 over a time range from a start time 204 to an end time 208, and at block 604, determining, by the WDA 160, a mean/median of the data samples 202 within a historic time window 210 extending from the start time 204 to an intermediate time 206 between the start time 204 and the end time 208. The method 600 also includes, at block 606, determining, by the WDA 160, a mean/median of the data samples 202 within a recent time window 220 extending between the intermediate time 206 and the end time 208, and at block 608, determining, by the WDA 160, a data sample delta (e.g., ($R_{Mean}$–$H_{Mean}$) or ($R_{Median}$–$H_{Median}$)) based on a difference between the mean/median of the recent data samples 202 (e.g., within the recent time window 220) and the mean/median of the historic data samples 202 (e.g., within the historic time window 210).

At block 610, the method 600 includes determining, by the WDA 160, whether the data sample delta exceeds a delta tolerance, e.g., using EQ. 1A or EQ. 1B. In some examples, the WDA 160 receives a tolerance configuration 300 (FIGS. 3A and 3B) indicating a tolerance type 302 and one or more tolerance constraints 304 associated with the tolerance type. The tolerance type 302 may include a mean-based delta tolerance $T_{Mean}$ (FIG. 3A) based on a historic mean ($H_{Mean}$) of the data samples 202 within the historic time window 210 and the tolerance constraints 304 including at least one of a constant term $C_T$, a mean coefficient $C_{Mean}$, or a standard deviation coefficient $C_{StdDev}$. In other scenarios, the tolerance type 302 includes a median-based delta tolerance $T_{Median}$ (FIG. 3B) based on a historic median ($H_{Median}$) of the data samples 202 within the historic time window 210 and the tolerance constraints 304 including at least one of the constant term $C_T$, a median coefficient $C_{Median}$, or a median absolute deviation coefficient $C_{MAD}$.

At block 612, the method 600 includes determining the regression in performance on the system 140 when the data sample delta exceeds the delta tolerance, the method 600. At block 614, the method 600 includes transmitting a regression alert 402 (FIG. 4A) from the data processing hardware 700 to a user device 110 associated with a user 10. The user device 110 is in communication with the data processing hardware 700. For instance, the data processing hardware 700 may transmit the regression alert 402 to the user device 110 over a network 130. The user device 110 is configured to notify the user 10 of the regression in performance in response to receiving the regression alert 402. For instance, the user device 110 may render a regression notification 450 (FIG. 4A) for display on a graphical user interface (GUI) 112 executing on the user device 110. Additionally or alternatively, the user device 110 may control one or more speakers 114 of the user device 110 to produce an audio signal 452 associated with the regression alert 402.

In some implementations, the method 600 includes receiving a tolerance configuration 300 at the data processing hardware 700 from the user device 110. The tolerance configuration 300 may identify a delta tolerance type 302 and include the user-defined tolerance constraints 304 for the identified tolerance type. The method 600 may also include determining, by the data processing hardware 700, the delta tolerance $T_{Median}$ for the identified tolerance type based upon the user-defined tolerance constraints 304 and the mean/median of the data samples 202 within the historic time window 210. The identified tolerance type may include a mean-based delta tolerance $T_{Mean}$ and the user-defined tolerance constraints 304 may include at least one of a constant term $C_T$, a mean coefficient $C_{Mean}$, or a standard deviation coefficient $C_{StdDev}$. Moreover, the method 600 may include calculating the mean-based delta tolerance $T_{Mean}$ using EQ. 2A. The identified tolerance type may also include a median-based delta tolerance $T_{Median}$ and the user-defined tolerance constraints 304 may include at least one of a constant term $C_T$, a median coefficient $C_{Median}$, or a median absolute deviation coefficient $C_{MAD}$. In such cases, the method 600 may include calculating the median-based delta tolerance $T_{Median}$ using EQ. 2B. The received tolerance configuration 300 may further indicate a directional bias 306 for the data sample delta including one of an ignore increase bias or an ignore decrease bias.

In some examples, when the directional bias 306 for the data sample delta includes the ignore increase bias and when the data sample delta exceeds the delta tolerance, the method 600 includes determining, by the data processing hardware 700, whether the data sample delta is greater than zero or less than zero. When the data sample delta is greater than zero, the method 600 may include determining, by the data processing hardware 700, no regression in performance exists. When the data sample delta is less than zero, the method 600 may include determining the regression in performance and transmitting the regression alert 402 from the data processing hardware 700 to the user device 110.

When the directional bias 306 for the data sample delta includes the ignore decrease bias and when the data sample delta exceeds the delta tolerance, the method 600 may include determining, by the data processing hardware 700, whether the data sample delta is greater than zero or less than zero. When the data sample delta is greater than zero, the method 600 may include determining the regression in performance and transmitting the regression alert 402 from the data processing hardware 700 to the user device 110. When the data sample delta is less than zero, the method 600 may include determining, by the data processing hardware 700, no regression in performance exists. Each received data sample 202 may include a duration of time for a service executing on the data processing hardware 700 to retrieve a data file 205 having a specified capacity from memory hardware in communication with the data processing hardware 700.

In some examples, the method 600 includes receiving, at the data processing hardware 700, an update for a service executing on the data processing hardware 700 from the user device 110 and setting, by the data processing hardware 700, the intermediate time 206 between the start time 204 and the end time 208 equal to a time of when the update for the service was received from the user device 110. The user device 110, in response to receiving the regression alert 402 from the data processing hardware 700, may be configured to render regression notification 450 for display upon a graphical user interface 112 executing on the user device 110. The regression notification 450 may notify the user 10 associated with the user device 110 of the regression in performance. The user device 110, in response to receiving the regression alert 402 from the data processing hardware 700, may be configured to control one or more speakers 114 of the user device 110 to produce an audio signal 452 associated with the alert signal, the audio signal 452 notifying the user 10 associated with the user device 110 of the regression in performance. The historic time window 210 and the recent time window 220 may include different times, and may be substantially the same size.

FIG. 7 is a schematic view of an example of the data processing hardware (e.g., computing device) 700 that may be used to implement the systems and methods described in this document. The data processing hardware 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The data processing hardware 700 includes a processor 750, memory 720, a storage device 730, a high-speed interface/controller 740 connecting to the memory 720 and high-speed expansion ports 750, and a low speed interface/controller 760 connecting to a low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a GUI on an external input/output device, such as a display 780 coupled to a high speed interface 740. In other implementations, multiple processors and/or multiple buses may be used, as appropriate, along with multiple memories and types of memory. Also, multiple data processing hardware devices 700 may be connected, with each device providing portions of the necessary operations (e.g., as a server bank, a group of blade servers, or a multi-processor system).

The memory 720 (e.g., memory hardware) includes hardware that stores information non-transitorily within the data processing hardware 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the data processing hardware 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 730 is capable of providing mass storage for the data processing hardware 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The data processing hardware 700 may be implemented in a number of different forms, as shown in the figure. For example, it may be implemented as a standard server or multiple times in a group of such servers, as a laptop computer, or as part of a rack server system.

In some implementations, the data processing hardware 700 implementing the window deviation analyzer (WDA) 160 and the service 170 is in communication with memory hardware in the memory 720 for implementing datastore 150 storing data files 205. The processor 710 executes the WDA 160 and the service 170. For example, the service 170 may execute a performance test on the datastore 150 and the WDA 160 may receive samples of data 202 each including a specified metric (e.g., a duration of time) associated with the performance test and a timestamp 203 associated with the corresponding data sample 202. The WDA 160 may distribute the data samples 202 into a historic time window 210 and a recent time window 220 based on the timestamps 203 and determine if the data samples in the recent time window 220 deviate from the data samples 202 in the historic time window 210. If the magnitude of deviation is large (e.g., greater than delta tolerance), then the WDA 160 may determine a regression in performance and transmit a regression alert 402 to a user device 110 in communication with the WDA 160.

A software application (i.e., a software resource 110s) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110hm may be physical devices used to store programs (e.g., sequences of instructions) or data (e.g., program state information) on a temporary or permanent basis for use by a computing device 110hc. The non-transitory memory 110hm may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, samples of data over a time range from a start time to an end time;
   determining, by the data processing hardware, a mean/median of the data samples within a historic time window extending from the start time to an intermediate time between the start time and the end time;
   determining, by the data processing hardware, a mean/median of the data samples within a recent time window extending from the intermediate time to the end time;
   determining, by the data processing hardware, a data sample delta based on a difference between the mean/median of the data samples within the recent time window and the mean/median of the data samples within the historic time window;
   receiving a tolerance configuration at the data processing hardware from a user device, the tolerance configuration:
      identifying a delta tolerance type;
      indicating a directional bias for the data sample delta, the directional bias comprising one of an ignore increase bias or an ignore decrease bias; and
      including user-defined tolerance constraints for the identified tolerance type;
   determining, by the data processing hardware, a delta tolerance for the identified tolerance type based upon the user-defined tolerance constraints and the mean/median of the data samples within the historic time window;
   determining whether the data sample delta exceeds the delta tolerance;
   when the data sample delta exceeds the delta tolerance:
      determining, by the data processing hardware, a regression in performance; and
      transmitting a regression alert from the data processing hardware to the user device, the user device configured to notify a user associated with the user device of the regression in performance in response to receiving the regression alert; and
   when the directional bias for the data sample delta comprises the ignore increase bias and the data sample delta exceeds the delta tolerance:
      determining, by the data processing hardware, whether the data sample delta is greater than zero or less than zero;
      when the data sample delta is greater than zero, determining, by the data processing hardware, no regression in performance exists; and
      when the data sample delta is less than zero:
         determining the regression in performance; and
         transmitting the regression alert from the data processing hardware to the user device.

2. The method of claim 1, wherein the identified tolerance type comprises a mean-based delta tolerance and the user-defined tolerance constraints comprise at least one of a constant term, a mean coefficient, or a standard deviation coefficient.

3. The method of claim 1, wherein the identified tolerance type comprises a median-based delta tolerance and the user-defined tolerance constraints comprise at least one of a constant term, a median coefficient, or a median absolute deviation coefficient.

4. The method of claim 1, wherein each received data sample comprises a duration of time for a service executing on the data processing hardware to retrieve a data file having a specified capacity from memory hardware in communication with the data processing hardware.

5. The method of claim 1, further comprising:
receiving, at the data processing hardware, an update for a service executing on the data processing hardware from the user device; and
setting, by the data processing hardware, the intermediate time between the start time and the end time equal to a time of when the update for the service was received from the user device.

6. The method of claim 1, wherein the user device, in response to receiving the regression alert from the data processing hardware, is configured to render regression notification for display upon a graphical user interface executing on the user device, the regression notification notifying the user associated with the user device of the regression in performance.

7. The method of claim 1, wherein the user device, in response to receiving the regression alert from the data processing hardware, is configured to control one or more speakers of the user device to produce an audio signal associated with the alert signal, the audio signal notifying the user associated with the user device of the regression in performance.

8. The method of claim 1, wherein the historic time window and the recent time window comprise different sizes.

9. The method of claim 1, wherein the historic time window and the recent time window comprise substantially the same size.

10. A method comprising:
receiving, at data processing hardware, samples of data over a time range from a start time to an end time;
determining, by the data processing hardware, a mean/median of the data samples within a historic time window extending from the start time to an intermediate time between the start time and the end time;
determining, by the data processing hardware, a mean/median of the data samples within a recent time window extending from the intermediate time to the end time;
determining, by the data processing hardware, a data sample delta based on a difference between the mean/median of the data samples within the recent time window and the mean/median of the data samples within the historic time window;
receiving a tolerance configuration at the data processing hardware from a user device, the tolerance configuration identifying a delta tolerance type and including user-defined tolerance constraints for the identified tolerance type, wherein the identified tolerance type comprises a mean-based delta tolerance and the user-defined tolerance constraints comprise at least one of a constant term, a mean coefficient, or a standard deviation coefficient;
determining, by the data processing hardware, a delta tolerance for the identified tolerance type based upon the user-defined tolerance constraints and the mean/median of the data samples within the historic time window;
determining whether the data sample delta exceeds the delta tolerance; and
when the data sample delta exceeds the delta tolerance:
determining, by the data processing hardware, a regression in performance; and
transmitting a regression alert from the data processing hardware to the user device in communication with the data processing hardware, the user device configured to notify a user associated with the user device of the regression in performance in response to receiving the regression alert,
wherein the mean-based delta tolerance is calculated as follows:

$$T_{Mean} = C_T + (C_{Mean} \times H_{Mean}) + (C_{StdDev} \times H_{StdDev}),$$

wherein $T_{Mean}$ is the mean-based delta tolerance, $C_T$ is the constant term, $C_{Mean}$ is the mean coefficient, $H_{Mean}$ is a mean of the historic data samples, $C_{StdDev}$ is a standard deviation coefficient, and $H_{StdDev}$ is a standard deviation of the historic data samples.

11. A method comprising:
receiving, at data processing hardware, samples of data over a time range from a start time to an end time;
determining, by the data processing hardware, a mean/median of the data samples within a historic time window extending from the start time to an intermediate time between the start time and the end time;
determining, by the data processing hardware, a mean/median of the data samples within a recent time window extending from the intermediate time to the end time;
determining, by the data processing hardware, a data sample delta based on a difference between the mean/median of the data samples within the recent time window and the mean/median of the data samples within the historic time window;
receiving a tolerance configuration at the data processing hardware from a user device, the tolerance configuration identifying a delta tolerance type and including user-defined tolerance constraints for the identified tolerance type, wherein the identified tolerance type comprises a median-based delta tolerance and the user-defined tolerance constraints comprise at least one of a constant term, a median coefficient, or a median absolute deviation coefficient;
determining, by the data processing hardware, a delta tolerance for the identified tolerance type based upon the user-defined tolerance constraints and the mean/median of the data samples within the historic time window;
determining whether the data sample delta exceeds the delta tolerance; and
when the data sample delta exceeds the delta tolerance:
determining, by the data processing hardware, a regression in performance; and
transmitting a regression alert from the data processing hardware to the user device, the user device configured to notify a user associated with the user device of the regression in performance in response to receiving the regression alert,
wherein the median-based delta tolerance is calculated as follows:

$$T_{Mean} = C_T + (C_{Median} \times H_{Median}) + (C_{MAD} \times H_{MAD}),$$

wherein $T_{Median}$ is the median-based delta tolerance, $C_T$ is the constant term, $C_{Median}$ is the median coefficient, $H_{Median}$ is a median of the historic data samples, $C_{MAD}$ is the median absolute deviation coefficient, and $H_{MAD}$ is a median absolute deviation of the historic data samples.

12. A method comprising:
receiving, at data processing hardware, samples of data over a time range from a start time to an end time;
determining, by the data processing hardware, a mean/median of the data samples within a historic time window extending from the start time to an intermediate time between the start time and the end time;
determining, by the data processing hardware, a mean/median of the data samples within a recent time window extending from the intermediate time to the end time;
determining, by the data processing hardware, a data sample delta based on a difference between the mean/median of the data samples within the recent time window and the mean/median of the data samples within the historic time window;
receiving a tolerance configuration at the data processing hardware from a user device, the tolerance configuration:
    identifying a delta tolerance type;
    indicating a directional bias for the data sample delta, the directional bias comprising one of an ignore increase bias or an ignore decrease bias; and
    including user-defined tolerance constraints for the identified tolerance type; and
determining, by the data processing hardware, a delta tolerance for the identified tolerance type based upon the user-defined tolerance constraints and the mean/median of the data samples within the historic time window;
determining whether the data sample delta exceeds the delta tolerance;
when the data sample delta exceeds the delta tolerance:
    determining, by the data processing hardware, a regression in performance; and
    transmitting a regression alert from the data processing hardware to the user device, the user device configured to notify a user associated with the user device of the regression in performance in response to receiving the regression alert; and
when the directional bias for the data sample delta comprises the ignore decrease bias and the data sample delta exceeds the delta tolerance:
    determining, by the data processing hardware, whether the data sample delta is greater than zero or less than zero;
    when the data sample delta is greater than zero:
        determining the regression in performance; and
        transmitting the regression alert from the data processing hardware to the user device; and
    when the data sample delta is less than zero, determining, by the data processing hardware, no regression in performance exists.

13. A system comprising:
data processing hardware of a distributed system; and
memory hardware in communication with the data processing hardware, the memory hardware storing instructions that when executed on the data processing hardware cause the data processing hardware to perform operations comprising:
    receiving samples of data over a time range from a start time to an end time;
    determining a mean/median of the data samples within a historic time window extending from the start time to an intermediate time between the start time and the end time;
    determining a mean/median of the data samples within a recent time window extending from the intermediate time to the end time;
    determining a data sample delta based on a difference between the mean/median of the data samples within the recent time window and the mean/median of the data samples within the historic time window;
    receiving a tolerance configuration from a user device, the tolerance configuration:
        identifying a delta tolerance type;
        indicating a directional bias for the data sample delta, the directional bias comprising one of an ignore increase bias or an ignore decrease bias; and
        including user-defined tolerance constraints for the identified tolerance type;
    determining a delta tolerance for the identified tolerance type based upon the user-defined tolerance constraints and the mean/median of the data samples within the historic time window;
    determining whether the data sample delta exceeds the delta tolerance;
    when the data sample delta exceeds the delta tolerance:
        determining a regression in performance; and
        transmitting a regression alert to the user device, the user device configured to notify a user associated with the user device of the regression in performance in response to receiving the regression alert; and
    when the directional bias for the data sample delta comprises the ignore increase bias and the data sample delta exceeds the delta tolerance:
        determining, by the data processing hardware, whether the data sample delta is greater than zero or less than zero;
        when the data sample delta is greater than zero, determining, by the data processing hardware, no regression in performance exists; and
        when the data sample delta is less than zero:
            determining the regression in performance; and
            transmitting the regression alert from the data processing hardware to the user device.

14. The system of claim 13, wherein the identified tolerance type comprises a mean-based delta tolerance and the user-defined tolerance constraints comprise at least one of a constant term, a mean coefficient, or a standard deviation coefficient.

15. The system of claim 13, wherein the identified tolerance type comprises a median-based delta tolerance and the user-defined tolerance constraints comprise at least one of a constant term, a median coefficient, or a median absolute deviation coefficient.

16. The system of claim 13, wherein each received data sample comprises a duration of time for a service executing on the data processing hardware to retrieve a data file having a specified capacity from memory hardware in communication with the data processing hardware.

17. The system of claim 13, wherein the operations further comprise:
receiving an update for a service executing on the data processing hardware from the user device; and setting the intermediate time between the start time and the end time equal to a time of when the update for the service was received from the user device.

18. The system of claim 13, wherein the user device, in response to receiving the regression alert from the data processing hardware, is configured to render regression notification for display upon a graphical user interface executing on the user device, the regression notification notifying the user associated with the user device of the regression in performance.

19. The system of claim 13, wherein the user device, in response to receiving the regression alert from the data processing hardware, is configured to control one or more speakers of the user device to produce an audio signal associated with the alert signal, the audio signal notifying the user associated with the user device of the regression in performance.

20. The system of claim 13, wherein the historic time window and the recent time window comprise different sizes.

21. The system of claim 13, wherein the historic time window and the recent time window comprise substantially the same size.

22. A system comprising:
data processing hardware; and
memory hardware in communication with the data processing hardware, the memory hardware storing instructions that when executed on the data processing hardware cause the data processing hardware to perform operations comprising:
receiving samples of data over a time range from a start time to an end time;
determining a mean/median of the data samples within a historic time window extending from the start time to an intermediate time between the start time and the end time;
determining a mean/median of the data samples within a recent time window extending from the intermediate time to the end time;
determining a data sample delta based on a difference between the mean/median of the data samples within the recent time window and the mean/median of the data samples within the historic time window;
receiving a tolerance configuration from a user device, the tolerance configuration identifying a delta tolerance type and including user-defined tolerance constraints for the identified tolerance type, wherein the identified tolerance type comprises a mean-based delta tolerance and the user-defined tolerance constraints comprise at least one of a constant term, a mean coefficient, or a standard deviation coefficient;
determining whether the data sample delta exceeds a delta tolerance; and
when the data sample delta exceeds the delta tolerance:
determining a regression in performance; and
transmitting a regression alert to the user device, the user device configured to notify a user associated with the user device of the regression in performance in response to receiving the regression alert,
wherein the mean-based delta tolerance is calculated as follows:

$$T_{Mean}=C_T+(C_{Mean} \times H_{Mean})+(C_{StdDev} \times H_{StdDev}),$$

wherein $T_{Mean}$ is the mean-based delta tolerance, $C_T$ is the constant term, $C_{Mean}$ is the mean coefficient, $H_{Mean}$ is a mean of the historic data samples, $C_{StdDev}$ is a standard deviation coefficient, and $H_{StdDev}$ is a standard deviation of the historic data samples.

23. A system comprising:
data processing hardware; and
memory hardware in communication with the data processing hardware, the memory hardware storing instructions that when executed on the data processing hardware cause the data processing hardware to perform operations comprising:
receiving samples of data over a time range from a start time to an end time;
determining a mean/median of the data samples within a historic time window extending from the start time to an intermediate time between the start time and the end time;
determining a mean/median of the data samples within a recent time window extending from the intermediate time to the end time;
determining a data sample delta based on a difference between the mean/median of the data samples within the recent time window and the mean/median of the data samples within the historic time window;
receiving a tolerance configuration from a user device, the tolerance configuration identifying a delta tolerance type and including user-defined tolerance constraints for the identified tolerance type, wherein the identified tolerance type comprises a median-based delta tolerance and the user-defined tolerance constraints comprise at least one of a constant term, a median coefficient, or a median absolute deviation coefficient;
determining whether the data sample delta exceeds a delta tolerance; and
when the data sample delta exceeds the delta tolerance:
determining a regression in performance; and
transmitting a regression alert to the user device, the user device configured to notify a user associated with the user device of the regression in performance in response to receiving the regression alert,
wherein the median-based delta tolerance is calculated as follows:

$$T_{Mean}=C_T+(C_{Median} \times H_{Median})+(C_{MAD} \times H_{MAD}),$$

wherein $T_{Median}$ is the median-based delta tolerance, $C_T$ is the constant term, $C_{Median}$ is the median coefficient, $H_{Median}$ is a median of the historic data samples, $C_{MAD}$ is the median absolute deviation coefficient, and $H_{MAD}$ is a median absolute deviation of the historic data samples.

24. A system comprising:
data processing hardware;
memory hardware in communication with the data processing hardware, the memory hardware storing instructions that when executed on the data processing hardware cause the data processing hardware to perform operations comprising:
receiving samples of data over a time range from a start time to an end time;
determining a mean/median of the data samples within a historic time window extending from the start time to an intermediate time between the start time and the end time;
determining a mean/median of the data samples within a recent time window extending from the intermediate time to the end time;

determining a data sample delta based on a difference between the mean/median of the data samples within the recent time window and the mean/median of the data samples within the historic time window;
receiving a tolerance configuration from a user device, the tolerance configuration:
identifying a delta tolerance type;
indicating a directional bias for the data sample delta, the directional bias comprising one of an ignore increase bias or an ignore decrease bias; and
including user-defined tolerance constraints for the identified tolerance type;
determining a delta tolerance for the identified tolerance type based upon the user-defined tolerance constraints and the mean/median of the data samples within the historic time window;
determining whether the data sample delta exceeds the delta tolerance;
when the data sample delta exceeds the delta tolerance:
determining a regression in performance; and
transmitting a regression alert to the user device, the user device configured to notify a user associated with the user device of the regression in performance in response to receiving the regression alert; and
when the directional bias for the data sample delta comprises the ignore decrease bias and the data sample delta exceeds the delta tolerance:
determining whether the data sample delta is greater than zero or less than zero;
when the data sample delta is greater than zero:
determining the regression in performance; and
transmitting the regression alert from the data processing hardware to the user device; and
when the data sample delta is less than zero, determining no regression in performance exists.

* * * * *